United States Patent
Minami et al.

(10) Patent No.: US 6,598,646 B1
(45) Date of Patent: Jul. 29, 2003

(54) TUBELESS PNEUMATIC TIRE WITH CARCASS HAVING BUTYL-BASED INNER TOPPING RUBBER LAYER

(75) Inventors: Nobuaki Minami, Shirakawa (JP); Kazuya Suzuki, Shirakawa (JP); Yukio Endo, Shirakawa (JP)

(73) Assignee: Sumitomo Rubber Industries Limited, Hyogo (JP)

(*) Notice: Subject to any disclaimer, the term of this patent is extended or adjusted under 35 U.S.C. 154(b) by 141 days.

(21) Appl. No.: 09/640,005

(22) Filed: Aug. 17, 2000

Related U.S. Application Data

(62) Division of application No. 09/245,856, filed on Feb. 8, 1999, now Pat. No. 6,148,889, which is a division of application No. 08/897,639, filed on Jul. 21, 1997, now Pat. No. 5,971,049, which is a division of application No. 08/505,896, filed on Jul. 24, 1995, now Pat. No. 5,688,343.

(30) Foreign Application Priority Data

Aug. 22, 1994 (JP) .............................................. 6-196934
Mar. 16, 1995 (JP) .............................................. 7-57747

(51) Int. Cl.⁷ .............................. B60C 1/00; B60C 9/02; B60C 15/00
(52) U.S. Cl. ........................ 152/550; 152/551; 152/564
(58) Field of Search ................................ 152/510, 564, 152/542, 543, 546, 548, 550–554

(56) References Cited

U.S. PATENT DOCUMENTS

| | | | |
|---|---|---|---|
| 2,587,428 A | 2/1952 | Antonson | 152/510 |
| 3,612,138 A | 10/1971 | Ravenhall | 152/543 |
| 4,155,394 A | 5/1979 | Shepherd et al. | 152/543 X |
| 4,941,523 A | 7/1990 | Galante et al. | 152/543 |
| 5,007,472 A | 4/1991 | Kuze et al. | 152/543 X |
| 5,401,789 A | 3/1995 | Wolff et al. | 152/564 X |
| 5,405,897 A | 4/1995 | Segatta et al. | 152/564 X |

FOREIGN PATENT DOCUMENTS

| | | | |
|---|---|---|---|
| EP | 0475733 A3 | 3/1992 | |
| FR | 1211735 | 3/1960 | 152/551 |
| FR | 2669582 | 5/1992 | |
| GB | 1118067 | 6/1968 | 152/551 |
| JP | 62-152907 | 7/1987 | 152/550 |
| JP | 3-148305 | 6/1991 | 152/551 |
| JP | 4-90902 | 3/1992 | |
| JP | 5-8606 | 1/1993 | 152/548 |
| JP | 6-156007 | 6/1994 | |

OTHER PUBLICATIONS

Patent Abstracts of Japan, vol. 6, No. 178 (M–155), Sep. 11, 1982 and JP–A–57–087702 (Bridgestone Corp.), Jun. 1, 1982.

Patent Abstracts of Japan, vol. 14, No. 532 (M–1051), Nov. 22, 1990 + JP–A–2–225104 (Sumitomo Rubber Ind. Ltd.), Sep. 7, 1990.

Patent Abstracts of Japan, vol. 7, No. 31 (M–192), Feb. 8, 1983 + JP–A–57–186502 (Sumitomo Rubber Ind. Ltd.), Nov. 17, 1982.

*Primary Examiner*—Adrienne C. Johnstone
(74) *Attorney, Agent, or Firm*—Birch, Stewart, Kolasch & Birch, LLP

(57) ABSTRACT

A tubeless pneumatic tire is provided including a carcass having a carcass cord web and topping rubber layers covering the opposite sides of the carcass cord web, the carcass extending from a tread portion through a sidewall portion to a bead portion and turned up around a bead core outwardly from the inside of the tire in the axial direction of the tire, wherein only the inner one of the topping rubber layers which faces the inside of the tire is made of a butyl-based rubber.

5 Claims, 12 Drawing Sheets

Inside of tire

Inside of tire

Inside of tire

TUBELESS PNEUMATIC TIRE WITH CARCASS HAVING BUTYL-BASED INNER TOPPING RUBBER LAYER

This application is a divisional of application Ser. No. 09/245,856, filed on Feb. 8, 1999 now U.S. Pat. No. 6,148,889, which is a divisional of application Ser. No. 08/897,639, filed on Jul. 21, 1997 now U.S. Pat. No. 5,971,049 which was a divisional of application Ser. No. 08/505,896, filed on Jul. 24, 1995, now U.S. Pat. No. 5,688,343, the entire contents of which are hereby incorporated by reference.

BACKGROUND OF THE INVENTION

1. Field of the Invention

The present invention relates to light-weight tubeless pneumatic tires having excellent anti-airleak properties.

2. Description of Related Art

A typical structure of a tubeless pneumatic tire is shown in FIG. 10.

The tubeless tire includes a carcass ply 1 defining the carcass of the tire and comprising a carcass cord web made of organic fiber such as of nylon, steel wire or the like and a topping rubber covering the opposite surfaces of the carcass cord web. The carcass ply 1 extends from a tread portion through a shoulder portion and sidewall portion to a bead portion, and is turned up around a bead core 2 outwardly from the inside of the tire in the axial direction. The entire interior surface of the carcass ply 1 is lined with an inner liner 3 mainly made of butyl rubber which is excellent in air impermeability for the prevention of air charged in the tired from leaking there from, whereby the tubeless tire maintains a predetermined air pressure therein. As shown in FIG. 10, the tire further includes a tread reinforcing belt 4 such as a breaker or belt layer disposed on the outer surface of the carcass ply 1, and a rim 5.

Such a tubeless tire is light in weight because it has no tube, and in recent years, a further weight reduction of tires has been desired for achieving an energy-saving when the vehicle is operated.

Japanese Unexamined Patent Publication No. 4-90902 (1992) discloses a tubeless pneumatic tire which is made light by separately disposing there in inner liners in regions of the right and left sidewall portions thereof, i.e., by providing no inner liner in a region of the tread portion thereof. However, the major part of the interior surface of the tire is still lined with the inner liner and, therefore, the weight reduction of the tire is not significant.

On the other hand, Japanese Unexamined Patent Publication No. 6-156007 (1994) discloses a tubeless pneumatic tire comprising a carcass 9 consisting of a carcass cord web 7 and a topping rubber 8 of a butyl-based rubber covering the opposite surfaces of the carcass cord web 7, as shown in FIG. 11 (enlarged view of a bead portion) and FIG. 12 (sectional view of the carcass). In FIG. 11, reference numeral 10 denotes the bead core. Since the topping rubber 8 is formed of a butyl-based rubber which is excellent in air impermeability, and hence the carcass 9 per se exhibits the function of an inner liner, the inner liner can be entirely dispensed with. Thus, a satisfactory weight reduction can be achieved.

However, butyl-based rubbers have poor vulcanizability and adhesiveness in comparison with diene-based rubbers. If a tire has a topping rubber 8 entirely formed of a butyl-based rubber, the butyl-based rubber comes into contact with a ply layer (e.g., breaker ply, sidewall rubber or the like) disposed outside the carcass. This may cause the ply layer to be readily separated from the carcass, thereby causing a deterioration the durability of the tire.

SUMMARY OF THE INVENTION

It is an object of the present invention to provide a tubeless pneumatic tire that is made lighter by eliminating an inner liner without causing deterioration in the durability thereof.

In accordance with the present invention, there is provided a tubeless pneumatic tire comprising a carcass having a carcass cord web and topping rubber layers covering the opposite sides of the carcass cord web, the carcass extending from a tread portion through a sidewall portion to a bead portion and turned up around a bead core outwardly from inside of the tire in the axial direction of the tire, wherein only the inner one of the topping rubber layers is formed of a butyl-based rubber.

The carcass may include a single carcass ply or, alternatively, a plurality of carcass plies.

Where the carcass includes a plurality of carcass plies stacked one on another, only the inner one of the topping rubber layers of the innermost carcass ply is formed of the butyl-based rubber.

A tubeless tire having the carcass composed of a plurality of carcass plies stacked one on the other may include an innermost carcass ply extending from the tread portion through the sidewall portion to the bead portion and turned up around the bead core outwardly from inside of the tire in the axial direction of the tire, and an outer carcass ply extending from the tread portion through the sidewall portion to the bead portion and turned up around the bead core inwardly from outside of the tire in the axial direction so as to cover the turned-up portion of the innermost carcass ply, wherein only the inner one of the topping rubber layers of the innermost carcass ply is formed with a butyl-based rubber.

A tubeless tire having a carcass composed of a plurality of carcass plies stacked one on the other may include an outer carcass ply extending from the tread portion through the sidewall portion to the bead portion and turned up around the bead core outwardly from inside of the tire, an innermost carcass ply extending from the tread portion through the sidewall portion to the bead portion and terminating at the bead portion without being turned up around the bead core, and a bead apex rubber provided in that portion surrounded by the turned-up portion of the carcass and the bead core, wherein the difference Hc between radial distance Hb from the terminating end of the innermost carcass ply to a radially inside edge of the bead core and radial distance Ha from a radially outside edge of the bead apex rubber to the radially inside edge of the bead core is not less than 5 mm, and wherein only the inner one of the topping rubber layers of the innermost carcass ply is formed of the butyl-based rubber. The radial distance Hb from the terminating end of the innermost carcass ply to the radially inside edge of the bead core is preferably not greater than 20 mm.

In a tubeless tire having a carcass composed of a plurality of carcass plies stacked one on the other, the innermost carcass ply may be divided into two separate carcass ply portions, which are respectively disposed in regions corresponding to the opposite sidewall portions. The two carcass ply portions of the innermost carcass ply are preferably arranged so as to satisfy the following relation:

$$0.2Wb \leq Wn \leq 0.95Wb$$

where Wb is a tread width and Wn is a spacing between the two carcass ply portions of the innermost carcass ply.

In the tubeless pneumatic tire of the present invention, the aforesaid butyl-based rubber may include a butyl rubber or a derivative thereof as a main ingredient in an amount of not less than 60% by weight. The rubber gage Y between the carcass cord web and the interior surface of the tire may be about 0.8 mm to about 2.5 mm. The tubeless tire preferably includes a reinforcing rubber layer provided outside the turned-up portion of the carcass.

Further, the tubeless pneumatic tire of the present invention may include an inner liner covering the inner surface of the carcass. Alternatively, the topping rubber layer formed of the butyl-based rubber may define the interior surface of the tire without the inner liner being provided on the inner surface of the carcass.

Since the inner topping rubber layer of the carcass is formed of the butyl-based rubber which is excellent in air impermeability in accordance with the present invention, the tubeless pneumatic tire has an anti-airleak property comparable or superior to the conventional tubeless pneumatic tires and offers a lighter weight when it is not lined with an inner liner.

The tubeless pneumatic tire having the carcass composed of the plurality of carcass plies has an excellent anti-airleak property and a light weight while ensuring stable steering performance. In particular, the provision of the innermost carcass ply of the separation type realizes a further weight reduction of the tubeless pneumatic tire.

The lining of the inner topping rubber layer of the carcass with an inner liner further improves the anti-airleak property of the tubeless tire of the present invention.

Further, the provision of the reinforcing rubber layer improves the durability of the tubeless tire without increasing the weight of the tire very much.

These and other objects, and advantages of the present invention will become apparent from the following detailed description.

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

The present invention will now be described in detail with reference to the attached drawings.

First, a description will be made of tubeless pneumatic tire having a carcass composed of a single-layer carcass ply in accordance with a first embodiment of the present invention.

Figure 1:
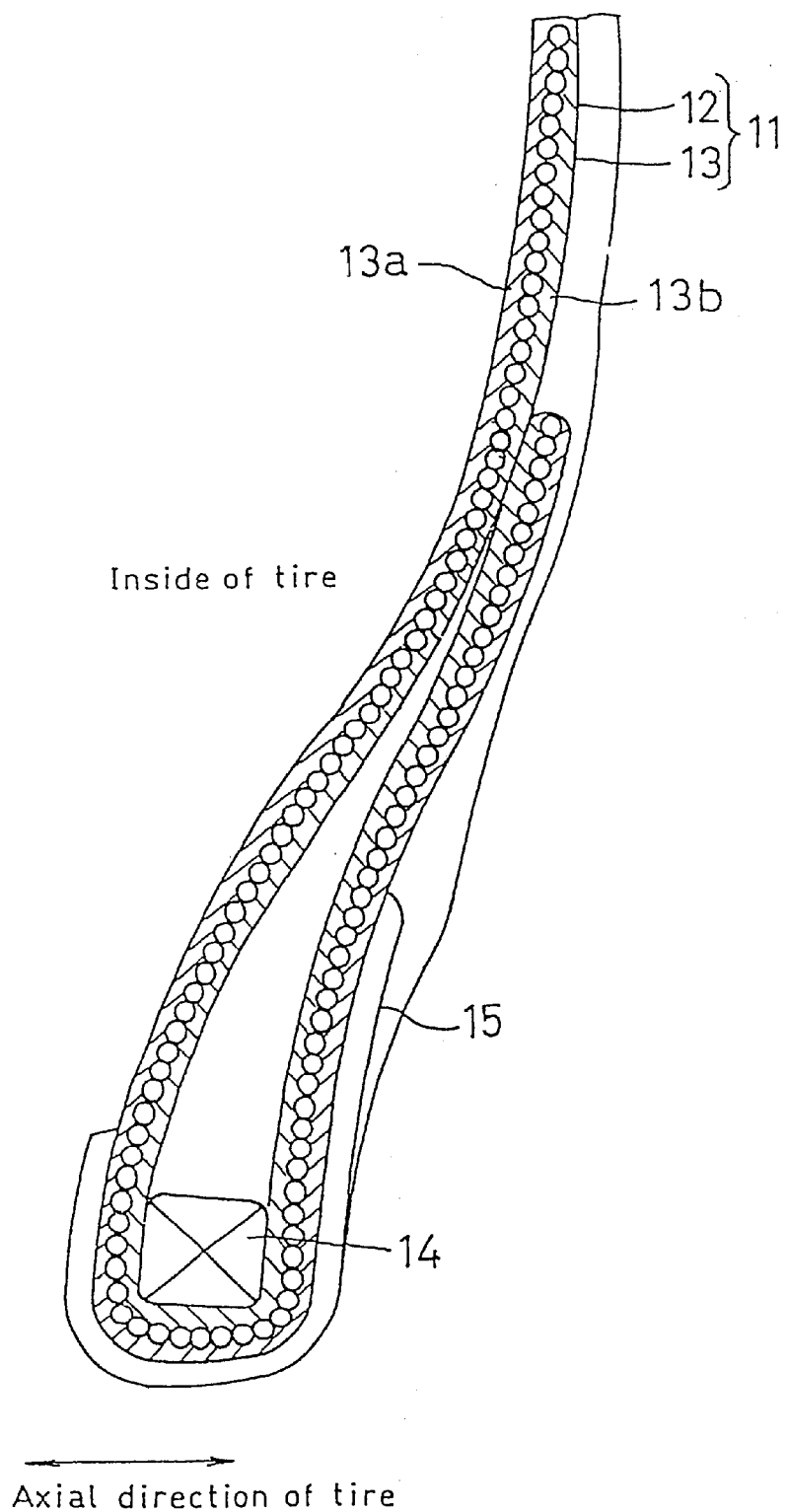
FIG. 1 is a partial enlarged sectional view illustrating a bead portion of a tubeless tire in accordance with a first embodiment of the present invention.

FIG. 1 is a partial enlarged sectional view illustrating a bead portion of the tubeless tire having a carcass (single-layer carcass ply) 11 in accordance with the first embodiment. As shown, the carcass 11 is turned up around a bead core 14 outwardly, from the inside of the tire in the axial direction of the tire. In FIG. 1, reference numeral 15 denotes a chafer made of an organic fiber web coated with rubber.

As shown in FIGS. 1 and 2, the carcass ply 11 includes carcass cord web 12, e.g., a cord fabric, such as nylon and topping rubber layers 13 covering the opposite sides of the carcass cord web. The inner layer 13a of the topping rubber layers 13 of the carcass ply is formed of a butyl-based rubber, while the outer layer 13b of the topping rubber layers 13 is made of a common diene-based rubber.

Figure 2A:
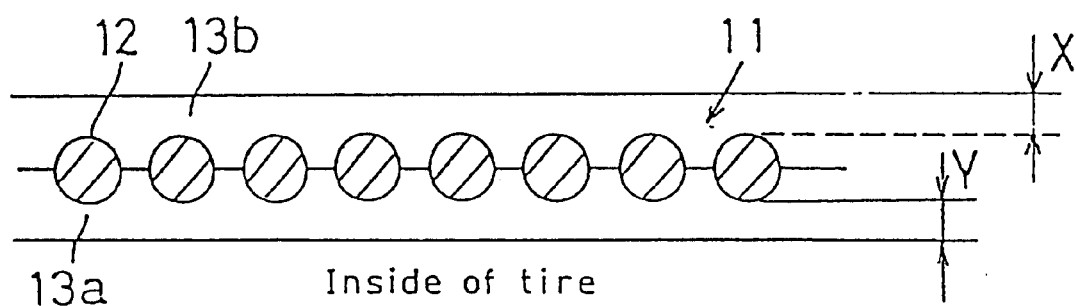
FIGS. 2(a) and (b) are schematic diagrams explaining the structure of a carcass ply of the tubeless tire of the first embodiment of the present invention.
Figure 2B:
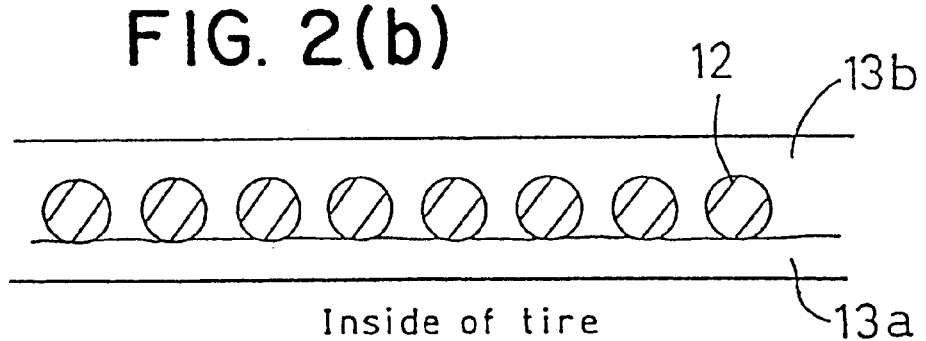

The carcass ply 11 is generally fabricated by weaving carcass cords into a carcass cord web 12 of cord fabric, then dipping the carcass cord web into an adhesive to improve the adhesiveness between the topping rubber layers 13 and the carcass cord web, and bonding the topping rubber sheets to opposite sides of the carcass cord web 12 by means of calendering. Therefore, the coverage state of the butyl-based rubber over the carcass cord web 12 varies depending on the thicknesses of the rubber sheets. That is, the boundary between the inner topping rubber layer 13a of the butyl-based rubber and the outer topping rubber layer 13b of the diene-based rubber may be substantially aligned with the center line of the carcass cord web 12 as shown in FIG. 2(a), or with the inner surface line of the carcass cord web 12 as shown in FIG. 2(b).

To be described next is a tubeless pneumatic tire having a carcass composed of a plurality of carcass plies in accordance with a second embodiment of the present invention. Such a tire is advantageously used in view of its good steering stability.

Figure 3:
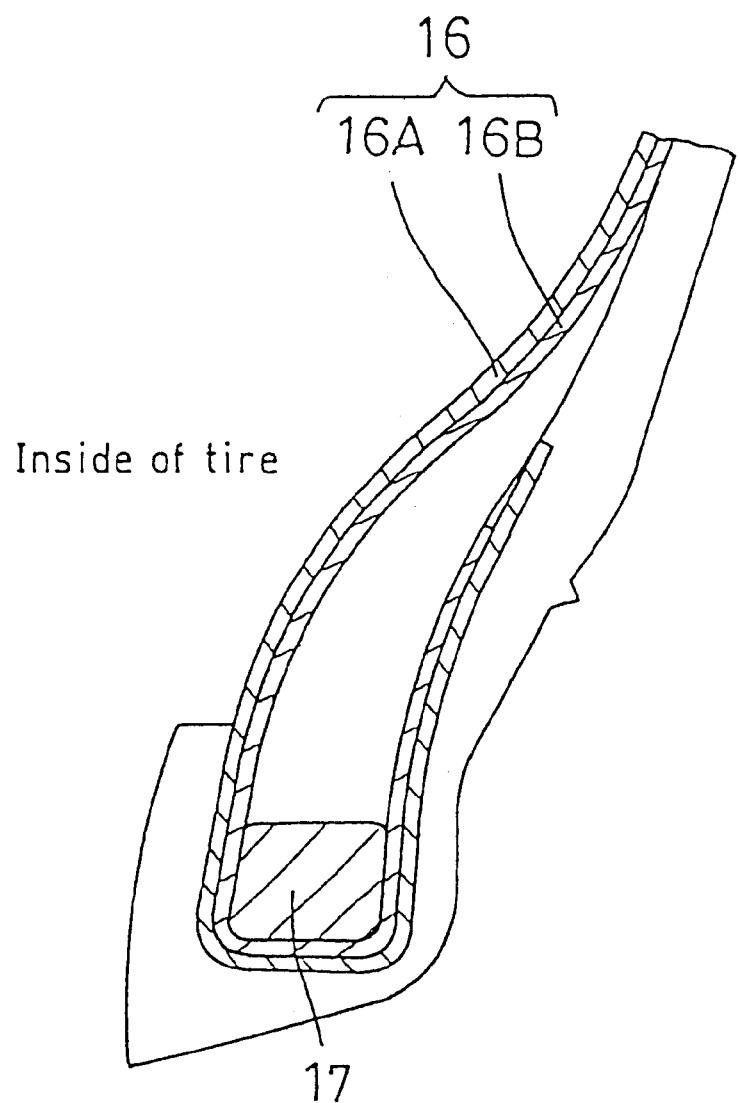
FIG. 3 is a partial enlarged sectional view illustrating a bead portion of a tubeless tire in accordance with a second embodiment of the present invention.
Figure 4:
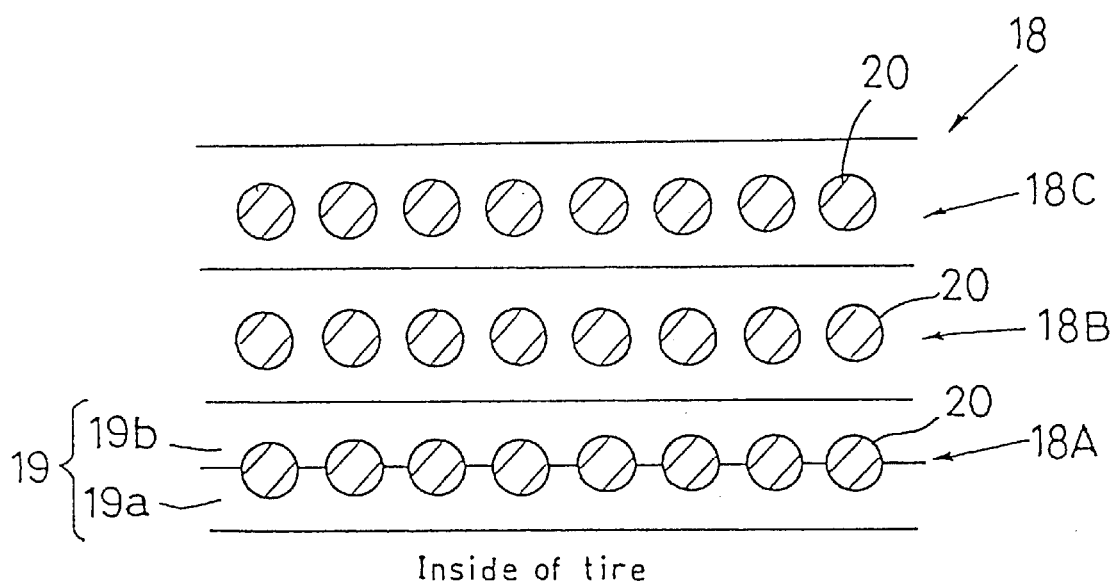
FIG. 4 is a schematic diagram for explaining the structure of a carcass composed of a plurality of carcass plies.

FIG. 3 illustrates a tubeless tire in accordance with the second embodiment. As shown, the carcass 16 comprises two carcass plies 16A and 16B which are integrally stacked one on the other. The carcass 16 is turned up around a bead core 17 outwardly from the inside of the tire in the axial direction of the tire. Similarly to the first embodiment, the carcass plies 16A and 16B are each composed of a carcass cord web and topping rubber layers covering the carcass cord web (shown in FIGS. 1 and 2, but not shown in FIG. 3). The inner one of the topping rubber layers of the inner carcass ply 16A is formed of a butyl-based rubber, like the carcass ply 11 of the first embodiment.

Where the carcass 16 comprises more than two carcass plies stacked one on the other, only the inner one of the topping rubber layers of the innermost carcass ply is formed of a butyl-based rubber, similarly to the aforesaid case. As shown in FIG. 4 which illustrates a carcass 18 composed of three carcass plies 18A, 18B and 18C, the inner layer 19a of the topping rubber layers 19 of the innermost carcass ply 18A is formed of the butyl-based rubber, while the outer layer 19b (on the side contacting the adjacent carcass ply 18B) is formed of a common diene-based rubber. In FIG. 4, reference numeral 20 denotes the carcass cords.

Figure 5:
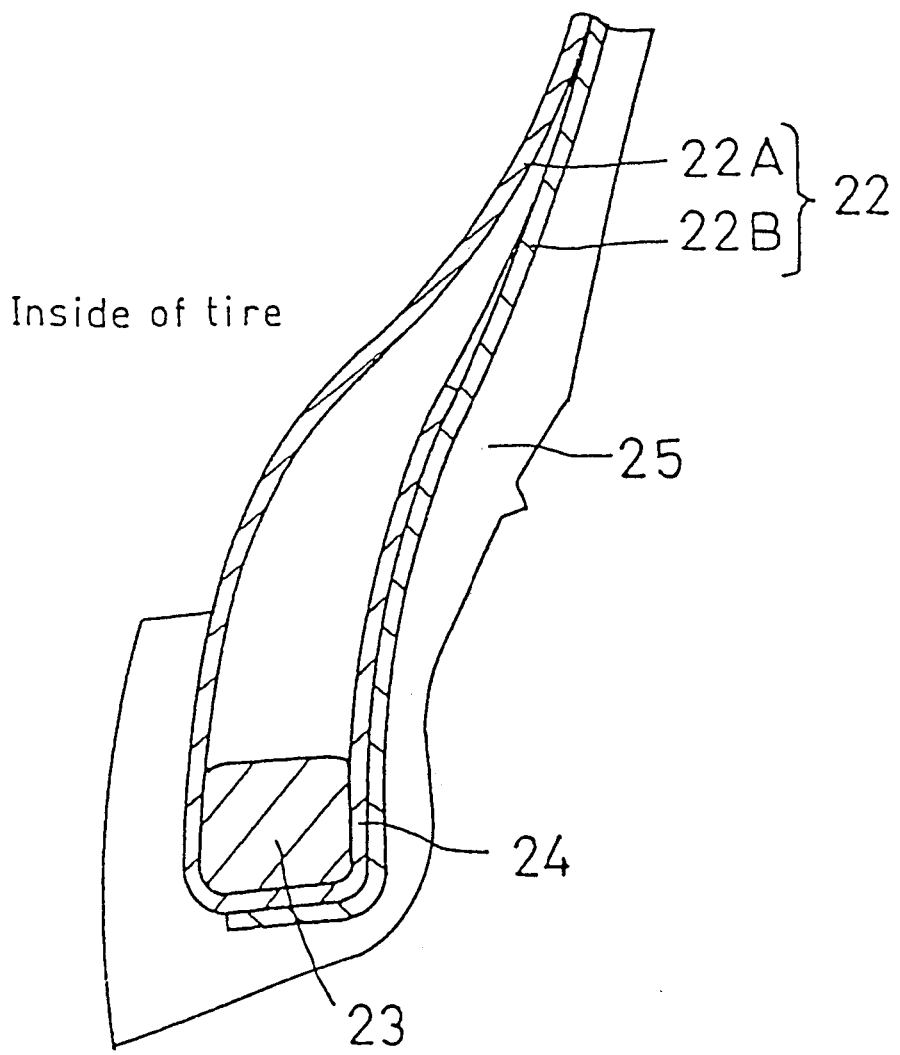
FIG. 5 is a partial enlarged sectional view illustrating a bead portion of a tubeless tire in accordance with a third embodiment of the present invention.

FIG. 5 illustrates a tubeless pneumatic tire in accordance with a third embodiment of the present invention. In this embodiment, a carcass 22 is composed of two carcass plies 22A and 22B. The inner carcass ply 22A is turned up around a bead core 23 outwardly from the inside of the tire in the axial direction of the tire, and the outer carcass ply 22B is turned around the bead core 23 from the outside of the tire in the axial direction of the tire so as to cover the turned-up portion 24 of the inner carcass ply 22A. The carcass plies 22A and 22B each comprise a carcass cord web and topping rubber layers covering the carcass cord web (not shown), like the carcass ply of the first embodiment. Only the inner one of the topping rubber layers of the inner carcass ply 22A is formed of a butyl-based rubber.

With this arrangement, the turned-up portion 24 where the topping rubber layer formed of the butyl-based rubber with poor adhesiveness orienting outward is covered with the outer carcass 22B having the topping rubber made of the diene-based rubber, the topping rubber of the diene-based rubber of the outer carcass ply 22B contacts the sidewall rubber located outside the carcass 22. Therefore, the topping rubber around the bead portion in the tubeless tire of the third embodiment exhibits improved adhesiveness in comparison with the tubeless tire of the second embodiment in which the inner carcass ply and outer carcass ply integrally stacked together are turned up around the bead core outwardly from the inside of the tire.

Though the carcass shown in FIG. 5 is composed of two carcass plies in this embodiment, the carcass may be composed of more than two carcass plies. In this case, either or both of the inner carcass ply 22A and the outer carcass ply 22B may be composed of a plurality of carcass plies stacked one on the other.

Figure 6:
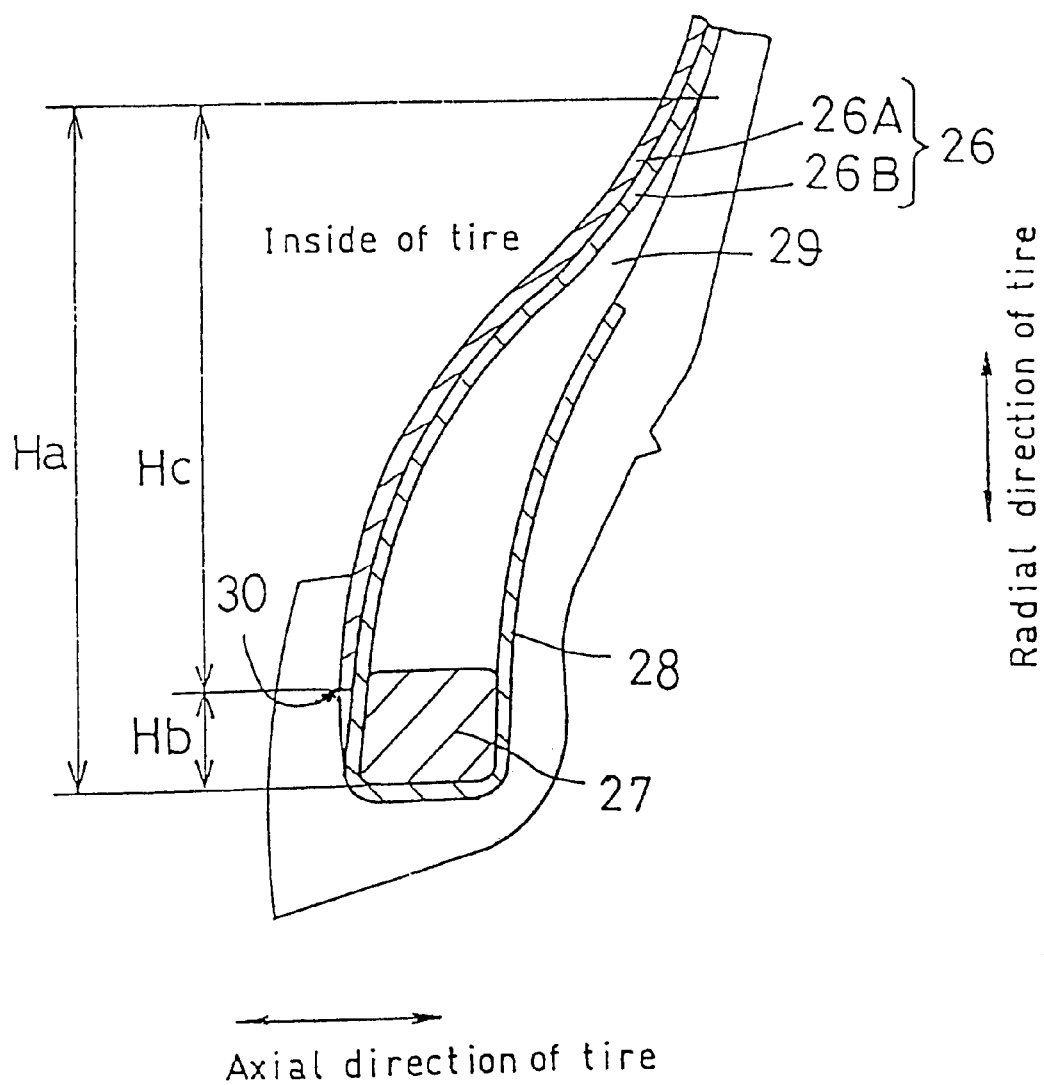
FIG. 6 is a partial enlarged sectional view illustrating a bead portion of a tubeless tire in accordance with a fourth embodiment of the present invention.

FIG. 6 illustrates a tubeless pneumatic tire in accordance with a fourth embodiment of the present invention. In this embodiment, a carcass 26 is composed of two carcass plies 26A and 26B. Only the outer carcass ply 26B is turned up around the bead core 27 for coverage thereof, and the inner carcass ply 26A extends from a tread portion through a sidewall portion to a bead portion and terminates at the bead portion without being turned up around the bead core 27. The carcass plies 26A and 26B each comprise a carcass cord web and topping rubber layers covering the carcass cord web (not shown), like the carcass ply of the first embodiment. The inner one of the topping rubber layers of the inner carcass ply 26A is formed of a butyl-based rubber.

As shown in FIG. 6, a bead apex rubber 29 tapering in the radial direction of the tire is provided in a portion surrounded by the turned-up portion 28 of the carcass ply 26B and the bead core 27. Difference Hc (=Ha−Hb) between radial distance Hb from the terminating end 30 of the inner carcass ply 26A to the radially inside edge (the lower end in FIG. 6) of the bead core 27 and radial distance Ha from the radially outside edge (the upper end in FIG. 6) of the bead apex rubber 29 to the radially inside edge of the bead core 27 is not less than 5 mm. The distance Hb is preferably not greater than 20 mm, more preferably not greater than 10 mm. If the distance Hc is less than 5 mm, the terminating end 30 of the inner carcass ply 26A is located too close to the radially outside edge of the bead apex rubber 29. This causes stress to be concentrated around the terminating end 30 and radially outside edge of the bead apex rubber 29 when the tire undergoes flexure, with the result that the occurrence of damage thereat is likely. If the distance Hb is greater than 20 mm, the terminating end 30 is positioned in a portion susceptible to the tire flexure, whereby the edge of the carcass cord web tends to be readily loosened around the terminating end 30.

The bead apex rubber, in general, is formed of a rubber harder than the sidewall rubber so that the lateral rigidity of the tire can be enhanced by the cooperation of the bead apex rubber and the turned-up portion of the carcass ply. This feature is not limited to the structure shown in FIG. 6, but is applicable to the tires of the first to third embodiments. Though the end of the turned-up portion 28 is located closer to the tire axis than the radially outside edge of the bead apex rubber 29, i.e., on the side closer to the bead core 27 in accordance with the embodiment shown in FIG. 6, the present invention is not limited to this structure. The end of the turned-up portion 28 may be located in a position radially more outward of the radially outside edge of the bead apex rubber 29, i.e., on the side closer to the tread portion (see the turned-up portion shown in FIG. 1).

As can be appreciated from the foregoing, there is no need to provide an inner liner in the tubeless tire, because the inner topping rubber layer of the carcass facing the inside of the tire is formed of the butyl-based rubber excellent in air impermeability. Therefore, the tubeless tire of the present invention can be more lightened than the conventional tubeless tires, and the fabrication thereof can be simplified. Since a joint portion which would otherwise appear between the inner liner and the topping rubber can be eliminated, the integrity of the tire components can be more enhanced, resulting in the tire of enhanced durability.

In a tire having a carcass 33 composed of a plurality of carcass plies (e.g., two carcass plies 33A and 33B in FIG. 7), the innermost carcass ply 33A may comprise two separate carcass ply portions, which are respectively disposed in regions corresponding to the opposite sidewall portions 34, in other words, the innermost carcass ply 33A may not be provided in a region corresponding to the tread portion 35. This arrangement reduces the weight of the tire having a plurality of carcass plies. In the tire having the carcass composed of the plurality of carcass plies, the tread portion 35, though not provided with the innermost carcass ply 33A, is generally provided with at least one carcass ply (e.g., the outer carcass ply 33B in FIG. 7) and further with a cord layer 36, a belt layer 37 and the like, on which a thick tread rubber 38 is provided. Therefore, an airleak problem rarely occurs even if a layer of the butyl-based rubber excellent in air impermeability is not provided in the tread portion. That is, it is unlikely that airleak problem occurs due to the absence of the innermost carcass ply 33A or the absence of the butyl-based rubber layer excellent in air impermeability.

Where the innermost carcass ply of separation type is provided, the two separate carcass ply portions are preferably arranged so as to satisfy the following relation:

$$0.2 Wb \leq Wn \leq 0.95 Wb$$

where Wb is the length of the breaker 37 corresponding to the tread width and Wn is the spacing between the two carcass ply portions of the innermost carcass ply 33A across the tread portion. If the length Wn is less than 0.2 Wb, substantial weight reduction cannot be expected. If the length Wn exceeds 0.95 Wb, the airleak problem becomes likely and the durability of the tire tends to be deteriorated.

Figure 8:
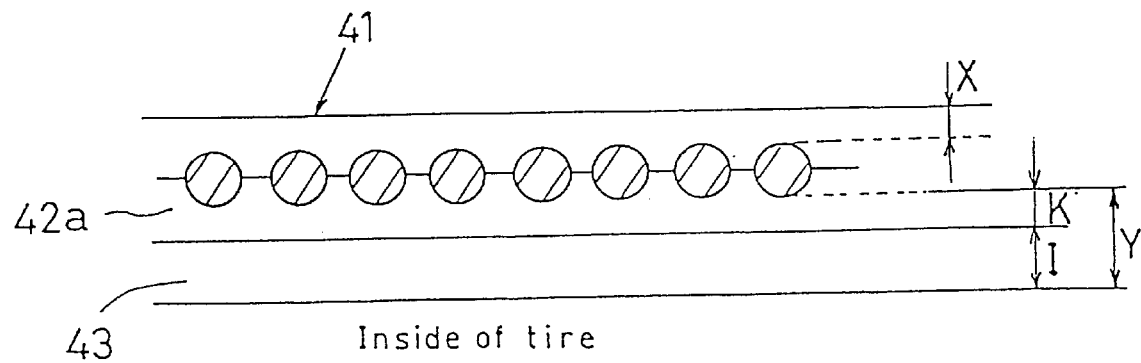
FIG. 8 is a schematic diagram for explaining the structure of a carcass ply lined with an inner liner.

Though none of the tubeless tires of the first to fourth embodiments is provided with an inner liner as shown in FIGS. 1, 3, 5 and 6, the present invention does not preclude the provision of the inner liner. As shown in FIG. 8, an inner liner 43 formed of a butyl-based rubber may be provided on an inner surface of the inner-most carcass ply 41 (or the carcass if the carcass is of a single-layer structure) having an inner topping rubber layer 42a of the butyl-based rubber to further enhance the air impermeability. Since the inner topping rubber layer 42a is formed of the butyl-based rubber exhibiting impermeability to air, the inner liner 43 can be made thin in comparison with an inner liner of a conventional tire in which the topping rubber is formed of a diene-based rubber. Hence, some weight reduction of the tire can be expected.

Next, reference is to be made to butyl-based rubbers to be used in the present invention. The butyl-based rubbers defined herein are meant to include butyl rubbers and derivatives thereof. The butyl rubbers are copolymers of isobutylene (saturated chain polymer unit) and a small amount of isoprene (polymer unit having a double bond). The derivatives of the butyl rubbers include halogenated butyl rubbers such as chlorinated butyl rubbers and brominated butyl rubbers which are obtained by reacting butyl rubber with halogens such as chlorine and bromine to improve vulcanizability of butyl rubber. The butyl rubbers and the derivatives thereof have low unsaturation degrees and, thus, are chemically stable and excellent in air impermeability.

The butyl-based rubber to be used in the present invention preferably contains a butyl rubber or a derivative thereof in an amount of not less than 60% by weight. If the proportion of butyl rubber is less than 60% by weight, unsatisfactory air impermeability may result. Other rubber ingredients to be blended with the butyl rubber or derivative thereof include natural rubbers, and diene-based rubbers such as butadiene rubber and styrene-butadiene rubber, but not limited thereto.

The topping rubber layer of such a butyl-based rubber is formed so that a gage Y (see FIG. 2) measured from the interior surface of the tire to the carcass cord web is preferably in the range between about 0.8 mm and about 2.5 mm, more preferably between about 1.0 mm and about 2.0 mm which depends on the composition of the butyl-based rubber to be used. If the gage Y is less than 0.8 mm, the inner topping rubber layer is extremely thin, so that cracks on the inner surface of the carcass are likely. Such cracks will deteriorate the durability and anti-airleak property of the tire. If the gage Y exceeds 2.5 mm, the weight of the tire cannot satisfactorily be reduced. If lined with an inner liner, the tire is preferably built so that the sum Y (see FIG. 8) of the thickness I of the inner liner and a gage K measured from the carcass cord web to the inner liner is in the aforesaid range, that the thickness I of the inner liner is in the range between about 0.5 mm and about 2.0 mm, and that the gage K is in the range between about 0.3 and about 1.5 mm. To be adequate, an average thickness of the inner topping rubber layer and an average proportion of the butyl-based rubber used therein after vulcanization molding of the tire are within the aforesaid respective ranges. To achieve more stable air impermeability, however, the gage Y throughout the interior surface of the tire is preferably within the aforesaid range.

In terms of the durability, the thickness X of the outer topping rubber layer (see FIGS. 2 and 8) is preferably about 0.5 mm to about 1.5 mm. If the thickness X is less than 0.5 mm, the carcass ply tends to be separated (or loosened) from a breaker ply or the like provided outside the carcass. If the thickness X exceeds 1.5 mm, a substantial increase in the weight of the tire is unavoidable and, as well, the carcass ply tends to be separated from the breaker ply or the like, resulting in the tire of deteriorated durability.

In the tubeless tire of the present invention, a rim reinforcing rubber layer 48 made of a diene-based rubber and having a thickness of about 0.5 mm to about 1.5 mm is preferably provided in a position outside a turned-up portion 47 of a carcass 45 turned up around a bead core 46 outwardly from the inside of the tire in the axial direction, as shown in FIG. 9. The provision of the reinforcing rubber layer 48 prevents portions of the carcass 45 formed of the butyl-based rubber 45 from coming in direct contact with a chafer 49, sidewall rubber 50 and the like, thereby preventing deterioration in the durability of the tire. Also, the provision of the reinforcing rubber layer 48 increases the rigidity of the tire around the bead portion to ensure enhanced steering performance of an automobile mounted with such tires. If the thickness of the reinforcing rubber layer 48 exceeds 1.5 mm, the weight of the tire is undesirably increased without any substantial durability improvement.

Figure 9A:
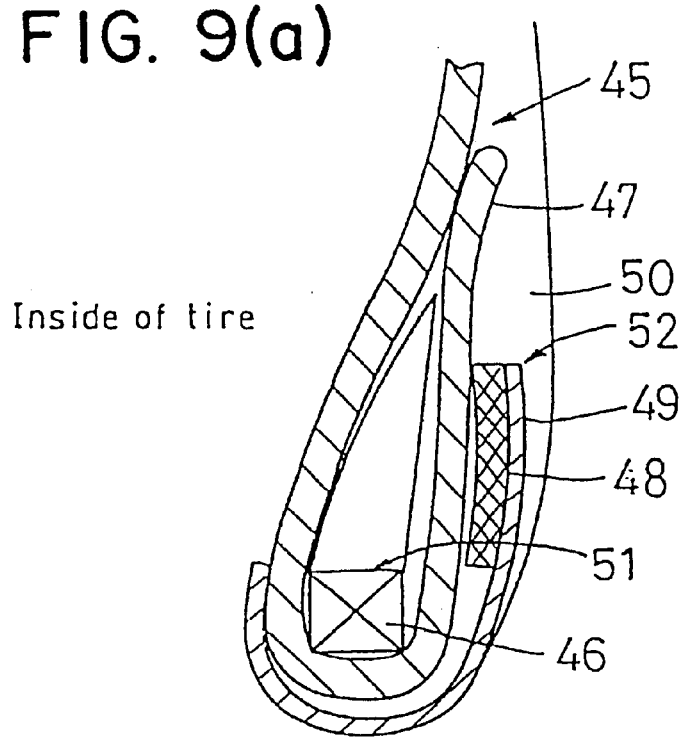
FIGS. 9(a) and (b) are partial enlarged views illustrating a bead portion of a tubeless tire provided with a reinforcing rubber layer in accordance with the present invention.
Figure 9B:
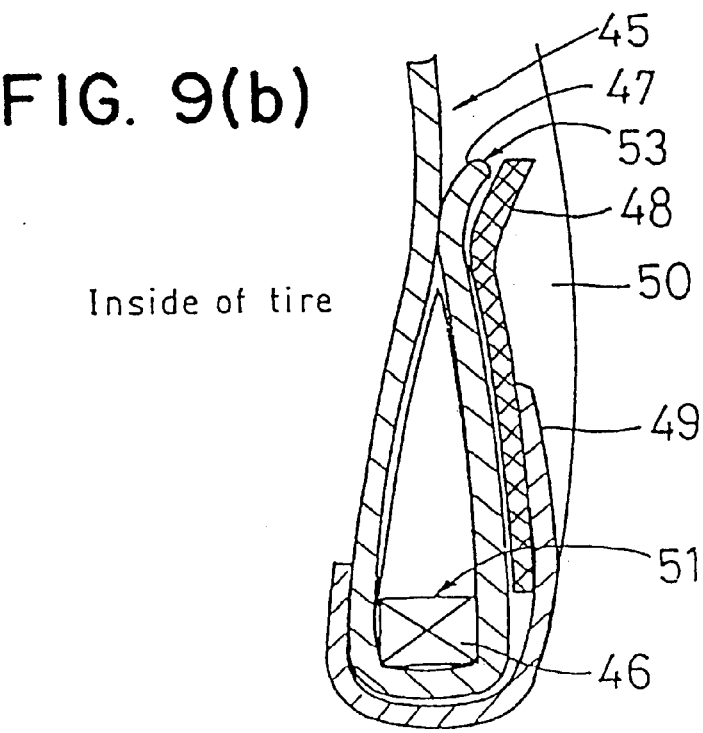
Figure 10:
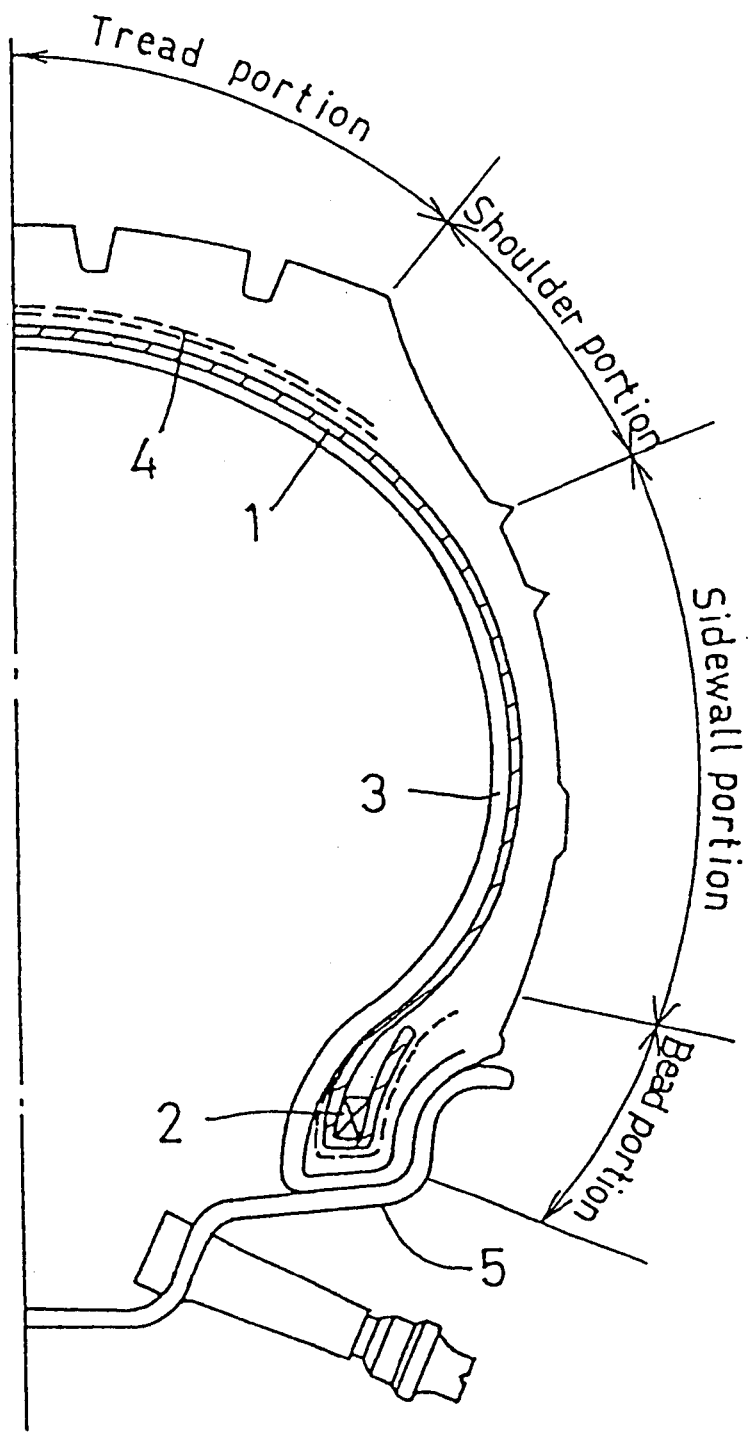
FIG. 10 is a diagram illustrating the structure of a conventional tubeless tire.
Figure 11:
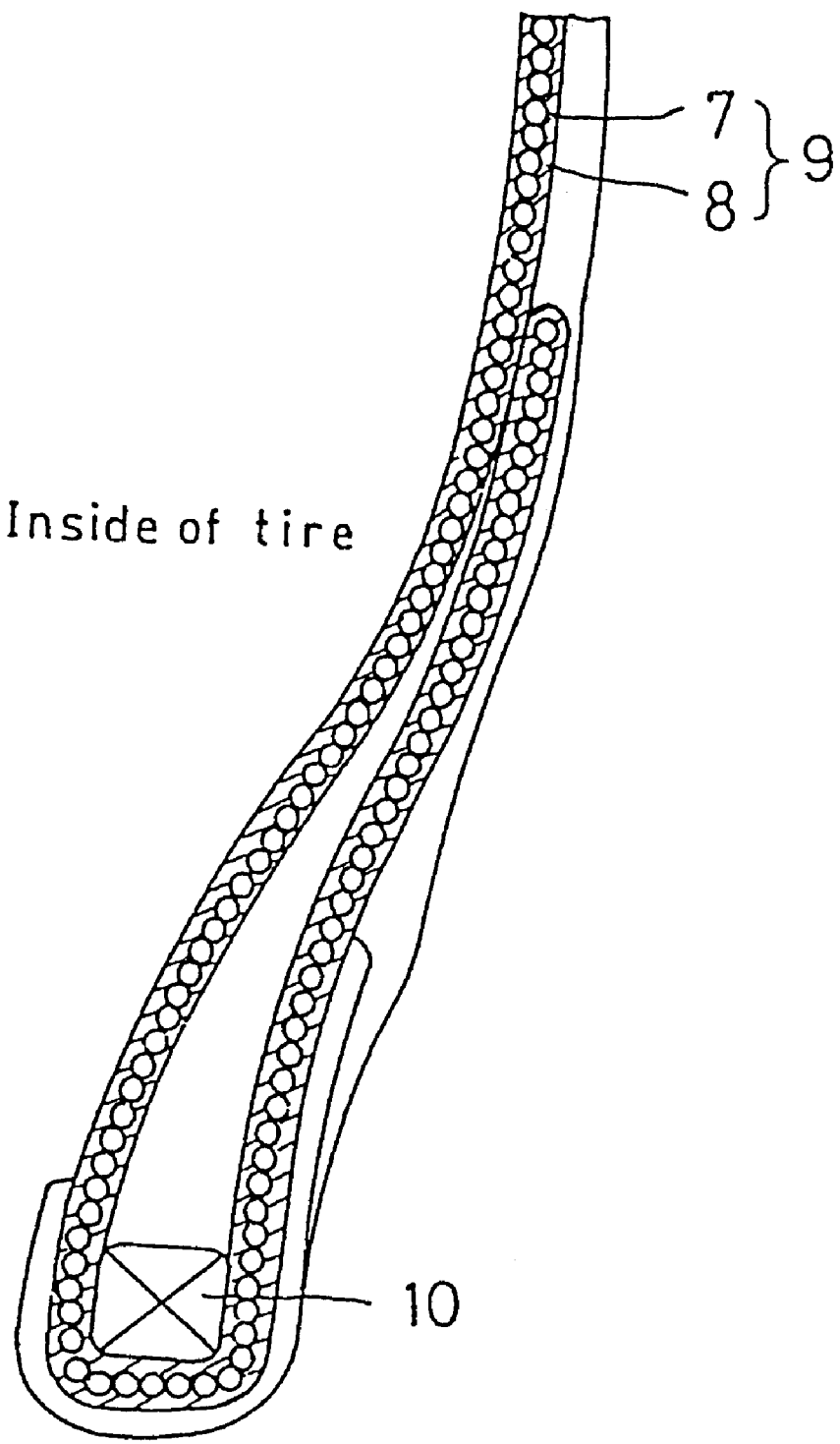
FIG. 11 is a partial enlarged view illustrating a bead portion of a conventional tubeless tire.
Figure 12:
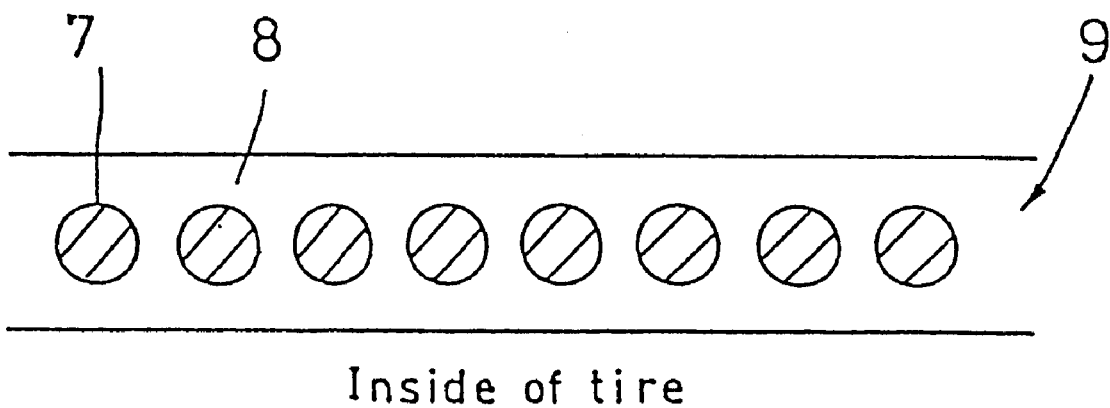
FIG. 12 is a schematic diagram for explaining the structure of a carcass of the tubeless tire shown in FIG. 11.

The rim reinforcing rubber layer 48 provided on the turned-up portion 47 preferably extends from a radially outside edge 51 of the bead core 46 to a radially outside edge 52 of a contact region between the turned-up portion 47 and chafer 49, as shown in FIG. 9(a), more preferably extends from the radially outside edge 51 of the bead core 46 to the end 53 of the turned-up portion 47 as shown in FIG. 9(b).

Where the tire has a carcass composed of a plurality of carcass plies, the rim reinforcing rubber layer may be provided in substantially the same manner as the embodiment shown in FIG. 9 having a single-layer carcass ply.

The present invention will be described by way of more specific embodiments.

An evaluation method of the characteristics of tires is as follows.

Evaluation (a) Durability

Fabricated tires were mounted on rims (14×6 JJ); and the inside pressures thereof were adjusted to 1.9 kg/cm$^2$. Then, the tires were applied on drums having a diameter of 1700 mm. After a 30,000 km driving test was carried out under predetermined conditions (load: 670 kg or 805 kg, speed: 80 km/h), the tires were inspected and evaluated according to the following three levels.

A: No change

B: Loose occurred though completing 30,000 km travel

C: Unable to travel 30,000 km (b) Airleak

Fabricated tires were mounted on rims (14×6 JJ), and the inside pressures thereof were adjusted to 2.0 kg/cm$^2$. After the tires were allowed to stand at a temperature of 21° C. for one month, decrease rates of the inside pressures of the tires were calculated. For every test sample, three tires were employed and an average value was calculated. Then, the decrease rate of the inside pressure for every test sample was expressed as an index by assuming the decrease rate of Reference Example 2 to be 100. A greater index value indicates that the tire has a more excellent anti-airleak property.

(c) Weight Reduction

The weight of every test sample was expressed as an index by assuming the weight of Reference Example 1 to be 100. A greater index value indicates that the tire is heavier.

Rubber compositions:

Six rubber compositions No. 1 to No. 6 shown in Table 1 were prepared to be employed for topping rubbers and inner liners. Among them, rubber compositions No. 3 to No. 6 are butyl-based rubbers. In Table 1, the value of each component is expressed in parts by weight relative to 100 parts of the rubber component.

TABLE 1

Appended as Attachment A.

| Rubber composition No. | 1 | 2 | 3 | 4 | 5 | 6 |
|---|---|---|---|---|---|---|
| Chlorinated butyl rubber | — | — | 50.0 | 60.0 | 70.0 | 100.0 |
| Natural rubber | 72.0 | 69.0 | 50.0 | 40.0 | 30.0 | 0 |
| Styrene-butadiene rubber | 28.0 | 31.0 | — | — | — | — |
| Butadiene rubber | — | — | — | — | — | — |
| Carbon black | 38.0 | 42.0 | 51.0 | 51.0 | 51.0 | 51.0 |
| Process oil | 9.8 | 3.5 | 0.3 | 0.3 | 0.3 | 0.3 |
| Sulfur | 3.0 | 1.5 | 1.2 | 1.2 | 1.2 | 1.2 |
| Zinc white | 5.0 | 3.0 | 5.0 | 5.0 | 5.0 | 5.0 |
| Vulcanization accelerator | 1.0 | 1.0 | 1.3 | 1.3 | 1.3 | 1.3 |
| Stearic acid | 2.0 | 2.2 | 1.2 | 1.2 | 1.2 | 1.2 |

Tire Having Carcass Composed of Single Carcass Ply

EXAMPLE 1

A carcass ply was fabricated using polyester fibers (1500 d/2,51 ends/5 cm) for the carcass cord web, and a butyl-based rubber composition No. 5 and a rubber composition No. 1 for the inner topping rubber layer and the outer topping rubber layer, respectively. With this carcass ply, a tubeless tire (size: 195/65R14) having no inner liner was built. Specifically, the inside topping rubber layer defined the interior surface of the tire (see FIG. 2(a), and the gage Y measured from the carcass cord web to the interior surface was 0.4 mm. The durability, anti-airleak property, and weight of the tubeless tire having such structure were evaluated in the aforesaid manner. The results are shown in Table 2.

EXAMPLES 2 TO 13

Carcass plies and tires were fabricated in substantially the same manner as in Example 1, except that rubber compositions employed for the topping rubbers and the gages of the inner topping rubber layers were different from Example 1 as shown in Table 2. The durability, anti-airleak property and weight of the tires thus built were evaluated in the same manner as in Example 1. The results are shown in Table 2.

The tires of Examples 8 and 9 each had a reinforcing rubber layer with a thickness t (shown in Table 2) provided on a turned-up portion of the carcass ply and extending from the radially outside face of the bead core to the radially outside edge of the turned-up portion as shown in FIG. 9(a).

EXAMPLE 14

A tubeless tire of Example 14 had a carcass ply lined with an inner layer as shown in FIG. 8. The inner liner and inner and outer topping rubber layers were respectively formed of rubber compositions as shown in Table 2. The tubeless tire having such structure was built, and the durability, anti-airleak property and weight thereof were evaluated. The results are shown in Table 2.

REFERENCE EXAMPLES 1 TO 4

Tubeless tires of Reference Examples 1 and 2 each had a carcass ply having topping rubber layers formed of a diene-based rubber and lined with an inner liner. A tubeless tire of Reference Example 3 had a carcass ply having topping rubber layers formed of a butyl-based rubber. A tubeless tire of Reference Example 4 had a carcass ply having topping rubber layers formed of a butyl-based rubber and lined with an inner liner. Rubber compositions employed for the topping rubber layers and inner liners in Reference Examples 1 to 4 are shown in Table 2. The tubeless tires having such structures were built, and the durability, anti-airleak property and weight thereof were evaluated. The results are shown in Table 2.

In Table 2, "C1" for the durability means that the tire was not able to travel 30,000 km due to air leak caused by cracks. "B1" means that the tire was able to travel 30,000 km but a looseness occurred.

TABLE 2 appended as Attachment B.

| Tire | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Rubber composition | | | | | | | | | | | | | | |
| Outer topping | 1 | 1 | 1 | 1 | 1 | 1 | 1 | 1 | 1 | 1 | 1 | 1 | 1 | 1 |
| Inner topping | 5 | 5 | 5 | 5 | 5 | 5 | 5 | 5 | 5 | 3 | 4 | 5 | 6 | 5 |
| Inner liner | — | — | — | — | — | — | — | — | — | — | — | — | — | 5 |
| Gage | | | | | | | | | | | | | | |
| K (mm) | 0.4 | 0.8 | 1.0 | 1.5 | 2.0 | 2.5 | 2.8 | 1.5 | 1.5 | 1.5 | 1.5 | 1.5 | 1.5 | 0.4 |
| I (mm) | — | — | — | — | — | — | — | — | — | — | — | — | — | 1.5 |
| Y (mm) | 0.4 | 0.8 | 1.0 | 1.5 | 2.0 | 2.5 | 2.8 | 1.5 | 1.5 | 1.5 | 1.5 | 1.5 | 1.5 | 1.9 |
| Reinforcing rubber Thickness t (mm) | — | — | — | — | — | — | — | 0.5 | 1.0 | — | — | — | — | — |
| Durability | | | | | | | | | | | | | | |
| Load 670 kg | C1 | A | A | A | A | A | A | A | A | A | A | A | A | A |
| Load 805 kg | — | — | — | B1 | — | — | A | A | A | — | — | — | — | — |
| Anti-airleak | 95 | 98 | 100 | 103 | 107 | 100 | 112 | 103 | 103 | 96 | 100 | 103 | 108 | 107 |
| Weight reduction | 93 | 94 | 95 | 97 | 100 | 102 | 105 | 98 | 99 | 97 | 97 | 97 | 97 | 100 |

| Tire | Reference Examples | | | |
|---|---|---|---|---|
| | 1 | 2 | 3 | 4 |
| Rubber composition | | | | |
| Outer topping | 1 | 1 | 5 | 5 |
| Inner topping | 1 | 1 | 5 | 5 |
| Inner liner | 5 | 2 | — | 5 |

TABLE 2-continued appended as Attachment B.

Gage

| | | | | |
|---|---|---|---|---|
| K (mm) | 0.4 | 0.4 | 1.5 | 0.4 |
| I (mm) | 1.5 | 1.5 | — | 1.5 |
| Y (mm) | 1.9 | 1.9 | 1.5 | 1.9 |
| Reinforcing rubber Thickness t (mm) | — | — | — | — |

Durability

| | | | | |
|---|---|---|---|---|
| Load 670 kg | A | A | B1 | B1 |
| Load 805 kg | — | — | — | — |
| Anti-airleak | 105 | 100 | 103 | 110 |
| Weight reduction | 100 | 100 | 97 | 100 |

As can be seen from Table 2, the tubeless tires of Examples 1 to 7 in each of which the inner topping rubber layer was formed of a butyl-based rubber as having a thickness greater than a predetermined value and the carcass ply was provided with no inner liner exhibited anti-airleak property and durability comparable or superior to those of a tire having a carcass ply lined with an inner liner. However, the tubeless tires of Examples 1 and 2 in each of which the gage of the inner topping rubber layer was relatively small exhibited enhanced anti-airleak property. On the other hand, the tubeless tires of Examples 6 and 7 in each of which the gage was relatively large exhibited enhanced anti-airleak property but were heavier than Reference Examples.

The tubeless tires of Examples 10 and 11 in each of which the inner topping rubber layer was formed of a rubber composition containing not greater than 60% by weight of butyl rubber did not exhibit significant superiority in anti-airleak property over Reference Examples 1 and 2 each having topping rubber layers formed of rubbers other than butyl-based rubbers. It is appreciated that as the content of butyl rubber in a rubber composition used for the inner topping rubber layer becomes higher, the anti-airleak property of the resulting tire becomes better without significantly increasing the weight of the tire (see Examples 10 to 13).

The tubeless tire of Example 14 in which the gage of the inner topping rubber layer formed of a butyl-based rubber was small but an inner liner formed of a butyl-based rubber was provided had an improved anti-airleak property, and yet the weight thereof was comparable to Reference Examples. On the other hand, the tubeless tires of Reference Examples 3 and 4 in each of which both the topping rubber layers were entirely formed of a butyl-based rubber exhibited improved anti-airleak property, but the durability thereof was deteriorated.

It is also appreciated from the comparison of Example 4 with Examples 8 and 9 that the durability of a tubeless tire can be improved by providing a reinforcing rubber layer.

Tires Having Carcass Composed of Plural Carcass Plies

Tubeless tires each having a carcass composed of a plurality of carcass plies were examined. These tubeless tires were of the structure in accordance with the fourth embodiment. Rubber compositions No. 1 to No. 6 shown in Table 1 were employed for the topping rubber.

EXAMPLES 15 TO 26 AND REFERENCE EXAMPLE 5 TO 8

Rubber compositions employed for the outer and inner topping rubber layers of the innermost carcass ply of each of the tires are shown in Table 3. Tubeless tires of Example 26 and Reference Examples 5, 6 and 8 had inner liners, and rubber compositions employed for the inner liners are shown in Table 3. The tires were of the structure shown in FIG. 6, in which the width Wb of a breaker ply was 144 mm, a distance Ha was 40 mm and a distance Hb was 5 mm.

The durability, anti-airleak property and weight of the tubeless tires having such structures were evaluated. The results are shown in Table 3.

In Table 3, "B2" for the durability means that the tire was able to travel 30,000 km but a loose occurred between a turned-up portion of the outer carcass ply and the inner carcass ply. "C2" means that the tire was unable to travel 30,000 km due to air leak caused by cracks.

TABLE 3 appended as Attachment C.

| | Examples | | | | | | | | | | | |
|---|---|---|---|---|---|---|---|---|---|---|---|---|
| Tire | 15 | 16 | 17 | 18 | 19 | 20 | 21 | 22 | 23 | 24 | 25 | 26 |

Rubber composition

| | | | | | | | | | | | | |
|---|---|---|---|---|---|---|---|---|---|---|---|---|
| Outer topping | 1 | 1 | 1 | 1 | 1 | 1 | 1 | 1 | 1 | 1 | 1 | 1 |
| Inner topping | 5 | 5 | 5 | 5 | 5 | 5 | 5 | 3 | 4 | 5 | 6 | 5 |
| Inner liner | — | — | — | — | — | — | — | — | — | — | — | 5 |

Gage

| | | | | | | | | | | | | |
|---|---|---|---|---|---|---|---|---|---|---|---|---|
| K (mm) | 0.4 | 0.8 | 1.0 | 1.5 | 2.0 | 2.5 | 2.8 | 1.5 | 1.5 | 1.5 | 1.5 | 0.4 |
| I (mm) | — | — | — | — | — | — | — | — | — | — | — | 1.5 |
| Y (mm) | 0.4 | 0.8 | 1.0 | 1.5 | 2.0 | 2.5 | 2.8 | 1.5 | 1.5 | 1.5 | 1.5 | 1.9 |

TABLE 3-continued appended as Attachment C.

Durability

| | | | | | | | | | | | | |
|---|---|---|---|---|---|---|---|---|---|---|---|---|
| Load 670 kg | C2 | A | A | A | A | A | A | A | A | A | A | A |
| Load 805 kg | — | — | — | A | — | — | — | — | — | — | — | — |
| Anti-airleak | 95 | 98 | 100 | 103 | 108 | 100 | 111 | 96 | 100 | 103 | 107 | 107 |
| Weight reduction | 92 | 94 | 95 | 97 | 100 | 102 | 106 | 97 | 97 | 97 | 97 | 100 |

| | Reference Examples | | | |
|---|---|---|---|---|
| Tire | 5 | 6 | 7 | 8 |
| Rubber composition | | | | |
| Outer topping | 1 | 1 | 5 | 5 |
| Inner topping | 1 | 1 | 5 | 5 |
| Inner liner | 5 | 2 | — | 5 |
| Gage | | | | |
| K (mm) | 0.4 | 0.4 | 1.5 | 0.4 |
| I (mm) | 1.5 | 1.5 | — | 1.5 |
| Y (mm) | 1.9 | 1.9 | 1.5 | 1.9 |
| Durability | | | | |
| Load 670 kg | A | A | B1 | B1 |
| Load 805 kg | — | — | — | — |
| Anti-airleak | 104 | 100 | 104 | 109 |
| Weight reduction | 100 | 100 | 97 | 100 |

As can be seen from Table 3, the tubeless tires of Examples 16 to 21 in each of which the inner topping rubber layer was formed of a butyl-based rubber as having a thickness greater than a predetermined value and the innermost carcass ply was provided with no inner liner, like the aforesaid Examples 1 to 7 (single carcass ply), exhibited anti-airleak property and durability comparable or superior to those of a tire having a carcass ply lined with an inner liner. However, the tubeless tires of Examples 15 and 16 in each of which the gage of the inner topping rubber layer was relatively small exhibited enhanced anti-airleak property. On the other hand, the tubeless tires of Examples 20 and 21 in each of which the gage was relatively large exhibited enhanced anti-airleak property but were heavier than Reference Examples.

The tubeless tires of Examples 22 and 23 in each of which the inner topping rubber layer was formed of a rubber composition containing not greater than 60% by weight of butyl rubber did not exhibit significant superiority in anti-airleak property over Reference Examples. It is appreciated that as the content of butyl rubber in a rubber composition of the inner topping rubber layer becomes higher, the anti-airleak property of the resulting tire becomes better without significantly increasing the weight of the tire (see Examples 22 to 25).

The tubeless tires of Examples 15 and 26 in each of which the gage of the inner topping rubber layer formed of butyl-based rubbers was small but an inner liner formed of a butyl-based rubber was provided had improved anti-airleak property, and yet the weight thereof was comparable to Reference Examples. On the other hand, the tubeless tires of Reference Examples 7 and 8 in each of which the entire topping rubber was formed of a butyl-based rubber exhibited improved anti-airleak property, but the durability thereof was deteriorated.

Next, a relationship between the tire performance and the position of the terminating end portion of the innermost carcass ply was examined.

EXAMPLES 27 AND 28 AND REFERENCE EXAMPLEs 9 AND 10

Tubeless tires of the structure shown in FIG. 6 (width Wb of a breaker ply: 144 mm) were built, in which only inner topping rubber layers of inner carcass plies were formed of butyl-based rubbers and distances Ha and Hb were variously changed as shown in Table 4. The distance Hc was not less than 5 mm in Examples 27 and 28, and was less than 5 mm in Reference Examples 9 and 10.

The durability, anti-airleak property and weight of the tubeless tires having such structures were evaluated. The results are shown in Table 4.

In Table 4, "B3" for the durability means that the tire was able to travel 30,000 km but a loose occurs along the radially outside edge of a bead apex rubber. "C3" means that the tire was not able to travel 30,000 km due to air leak and a looseness occurring along the radially outside edge of a bead apex rubber.

TABLE 4 appended as Attachment E.

| | Examples | | Reference Examples | |
|---|---|---|---|---|
| Tire | 27 | 28 | 9 | 10 |
| Rubber composition | | | | |
| Outer topping | 1 | 1 | 1 | 1 |
| Inner topping | 5 | 5 | 5 | 5 |
| Inner liner | — | — | — | — |
| Gage | | | | |
| K (mm) | 1.5 | 1.5 | 1.5 | 1.5 |
| I (mm) | — | — | — | — |
| Y (mm) | 1.5 | 1.5 | 1.5 | 1.5 |
| Ha | 40 | 40 | 40 | 40 |
| Hb | 10 | 35 | 40 | 45 |
| Hc = Ha − Hb | 30 | 5 | 0 | −5 |

TABLE 4-continued appended as Attachment E.

|  | Examples | | Reference Examples | |
|---|---|---|---|---|
| Tire | 27 | 28 | 9 | 10 |
| Durability | | | | |
| Load 670 kg | A | A | C3 | B3 |
| Load 805 kg | — | — | — | — |
| Anti-airleak | 103 | 103 | 102 | 101 |
| Weight reduction | 97 | 96 | 96 | 95 |

As can be seen from Table 4, tires in which the distance Hc was less than 5 mm exhibited poorer durability and anti-airleak property.

Tires Having Plural Carcass Plies in Which Innermost Carcass Ply is of Separation Type Tubeless tires each having a plurality of carcass plies of which the innermost carcass ply was of separation type were examined.

EXAMPLES 29 TO 32 AND REFERENCE EXAMPLE 11 AND 12

Figure 7:
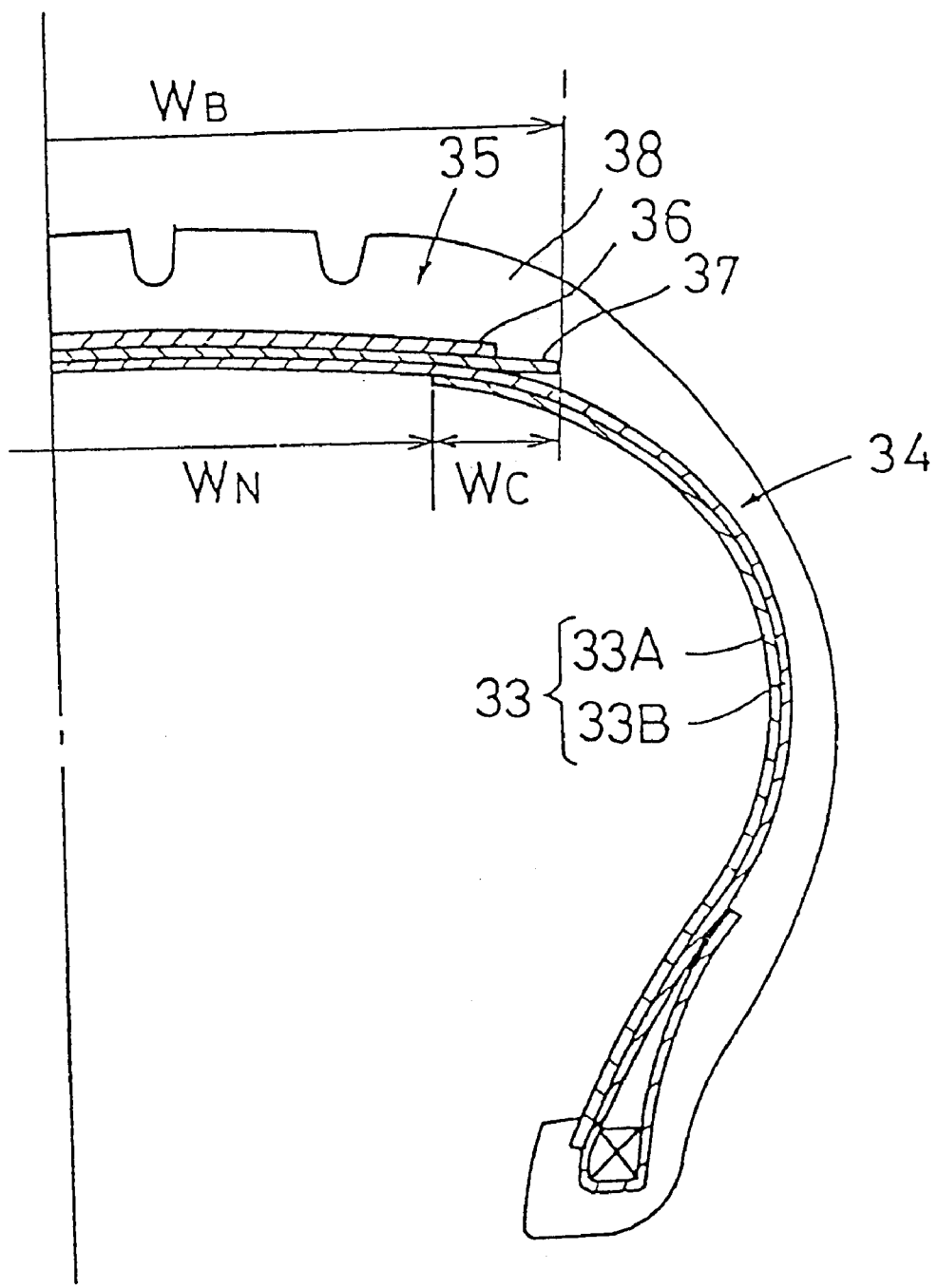
FIG. 7 is a partial enlarged sectional view illustrating a tubeless tire having a carcass of the separation type.

Tubeless tires each having a structure shown in FIG. 7 in which the width of a breaker ply was 144 mm and the innermost carcass ply was of separation type were built. The spacing Wn and overlapped length Wc (=½(Wb−Wn)) were variously changed as shown in Table 5. In tubeless tires of Reference Examples 11 and 12, the spacing Wn was greater than 0.95 Wb (136.8 mm). Rubber compositions employed for the outer and inner topping rubber layers of the innermost carcass ply of each tire and the gages of the topping rubber layers are shown in Table 5.

The durability, anti-airleak property and weight reduction of the tires having such structures were evaluated in the same manner as in Example 1. The evaluation results are shown in table 5. In Table 5, "C4" for the durability means that the tire was not able to travel 30,000 km due to looseness occurring along the breaker ply edge thereof. "C5" means that the tire was not able to travel 30,000 km due to looseness around the tread portion of the inner carcass ply thereof.

TABLE 5 appended as Attachment F.

|  | Examples | | | | Reference Examples | |
|---|---|---|---|---|---|---|
| Tire | 29 | 30 | 31 | 32 | 11 | 12 |
| Rubber composition | | | | | | |
| Outer topping | 1 | 1 | 1 | 1 | 1 | 1 |
| Inner topping | 5 | 5 | 5 | 5 | 5 | 5 |
| Inner liner | — | — | — | — | — | — |
| Gage | | | | | | |
| K (mm) | 1.5 | 1.5 | 1.5 | 1.5 | 1.5 | 1.5 |
| I (mm) | — | — | — | — | — | — |
| Y (mm) | 1.5 | 1.5 | 1.5 | 1.5 | 1.5 | 1.5 |
| Wn | 134 | 124 | 94 | 64 | 144 | 164 |
| Wc = 1/2 (Wb − Wn) | 5 | 10 | 25 | 40 | 0 | −10 |
| Durability | | | | | | |
| Load 670 kg | A | A | A | A | C4 | C5 |
| Load 805 kg | — | — | — | — | — | — |
| Anti-airleak | 103 | 103 | 103 | 103 | 103 | 102 |
| Weight reduction | 92 | 92 | 94 | 95 | 91 | 89 |

As can be seen from Table 5, weight reduction increased with increasing spacing Wn. On the other hand, the anti-airleak property was hardly influenced by the presence and the extent of the spacing Wn (see Examples 29 to 32 and Examples 27 and 28). Where the overlap between the breaker play and the innermost carcass ply, in particular, the portion topped with the butyl-based rubber was absent, the anti-airleak property and durability of the tire were deteriorated (see Reference Examples 11 and 12).

While only certain presently preferred embodiments of the present invention have been described in detail, as will be apparent with those familiar with the art, various changes and modifications can be made in embodiments without departing from the spirit and scope of the invention as defined by the following claims.

What is claimed is:

1. A tubeless pneumatic tire comprising:

a carcass comprising a plurality of carcass plies stacked one on the other, radially of the tire, each of said carcass plies having a carcass cord web and topping rubber layers unified with the carcass cord web on opposite sides thereof by calendering, said plurality of carcass plies including an outer carcass ply extending from the tread portion through the sidewall portion to the bead portion and turned up around the bead core outwardly from the inside of the tire in the axial direction and an innermost carcass ply extending from the tread portion through the sidewall portion to the bead portion and terminating at the bead portion without being turned up around the bead core;

an inner liner formed of a butyl-based rubber and covering an interior surface of the innermost topping rubber layer; and a bead apex rubber provided in a portion surrounded by the turned up portion of the carcass and the bead core, wherein the topping rubber layer of the interior surface of the innermost carcass ply is formed of a butyl-based rubber, the topping rubber layers other than the topping rubber layer of the interior surface of the innermost carcass ply are formed of a diene-based rubber material, and difference Hc between radial distance Hb from the terminating end of the innermost carcass ply to a radially inside edge of the bead core and radial distance Ha from a radially outside edge of the bead apex rubber to the radially inside edge of the bead core is not less than 5 mm.

2. The tubeless pneumatic tire as set forth in claim 1, wherein the innermost carcass ply is divided into two separate carcass ply portions, which are respectively disposed in regions corresponding to opposite sidewall portions.

3. The tubeless pneumatic tire as set forth in claim 2, wherein $W_n$ is the axial width between the radially outer ends of the two separate carcass ply portions and $W_b$ is a tread width, and $W_n$ and $W_b$ satisfy the relationship $$0.2W_b \leq Wn \leq 0.95W_b.$$

4. The tubeless pneumatic tire as set forth in claim 1, wherein the butyl-based rubber includes a butyl rubber or a derivative thereof as the main ingredient in an amount of not less than 60% by weight.

5. The tubeless pneumatic tire as set forth in claim 1, wherein a rubber gage Y between the carcass cord web and the interior surface of the tire ranges from 0.8 to 2.5 mm.

* * * * *